United States Patent [19]

Ribouleau

[11] Patent Number: 5,535,917
[45] Date of Patent: Jul. 16, 1996

[54] DISTRIBUTOR FOR A SEED SPACING DRILL WITH A FLAT DISTRIBUTOR DISC AND DEFLECTOR

[75] Inventor: Michel R. J. H. Ribouleau, Paris, France

[73] Assignee: Ateliers Ribouleau, Largeasse, France

[21] Appl. No.: 354,781

[22] Filed: Dec. 12, 1994

[30] Foreign Application Priority Data

Dec. 10, 1993 [FR] France ................................. 93 14887

[51] Int. Cl.⁶ ................................................... A01C 7/04
[52] U.S. Cl. ............................................. 221/211; 111/77
[58] Field of Search .................................. 221/211, 266, 221/278; 111/77, 78, 177, 185

[56] References Cited

U.S. PATENT DOCUMENTS

| | | |
|---|---|---|
| 1,331,235 | 2/1920 | Bristow . |
| 3,796,346 | 3/1974 | Ribouleau ............................. 111/185 |
| 4,047,638 | 9/1977 | Harrer et al. . |
| 4,898,108 | 2/1990 | McDermott .......................... 111/185 |
| 4,949,869 | 8/1990 | Ribouleau ............................. 221/211 |
| 5,082,126 | 1/1992 | Ribouleau ............................. 221/211 |

FOREIGN PATENT DOCUMENTS 2630288  10/1989  France .

*Primary Examiner*—H. Grant Skaggs
*Attorney, Agent, or Firm*—Wenderoth, Lind & Ponack

[57] ABSTRACT

Distributor for a seed spacing drill, including a casing having an overall cylindrical shape, inside of which a flat distributor disc is rotatably mounted. The disc is equipped with circumferentially-spaced holes which have dimensions smaller than the seeds to be distributed. The distributor disc separates a seed container from a auction device so that the holes are subjected to a depression for retaining the seeds taken up from the container during at least a part of their angular travel. A deflector member is provided to eliminate double seeds. A device is provided for discharging the seeds. The distributor disc includes at least two coaxial circular rows of holes which are subjected to the suction or depression until the holes register with the discharge device. The deflector is located, relative to the said distributor disc, so as to act only on the seeds located in the holes of the outermost or the innermost row.

7 Claims, 3 Drawing Sheets

DISTRIBUTOR FOR A SEED SPACING DRILL WITH A FLAT DISTRIBUTOR DISC AND DEFLECTOR

BACKGROUND OF THE INVENTION

The invention relates to precision seed spacing drills of the type including a casing of cylindrical overall shape, inside of which is rotatably mounted on a horizontal shaft, a flat distributor disc equipped with circumferentially-spaced holes which have dimensions smaller than the seeds. The distributor disc separates a seed container from a suction device so that the holes are subjected to suction or a depression for retaining the seeds taken up from the container during at least a part of the angular travel of the disc. A deflector member is provided to eliminate double seeds. A device for discharging the seeds is also provided.

Such a distributor is described in French Patent 2,630,288 of the assignee company; more particularly, the embodiment of FIG. 6 which represents a flat disc without fins interacting with a notched selector member.

In this embodiment, the flat disc includes a single circular row of holes which are subjected to the depression until they come close to the discharge device.

If one wishes to obtain even precise sowing, particularly without double seeds and without gaps, then it is necessary to limit the rotational speed of the distributor discs. As a result, in the case where seeds are to be sown densely in rows, the working speed must be low. Thus, for example, for sowing soy bean seeds, for a distance of 5 cm between plants, the working speed is currently limited to 6 km/h, if one wishes to obtain a crop without gaps or double seeds.

This is why one tends to use discs including a maximum number of holes, but the number of holes is limited by the dimensions of the distributor disc.

For high-density sowing, such as the sowing of soy bean seeds, the maximum number of holes allowed on the circumference of the distributor disc does not allow for fast work while maintaining a sufficiently slow rotation.

The present invention therefore aims to provide a distributor for a seed spacing drill of the abovementioned type which makes it possible to obtain a high sowing density while keeping the speed of the distributor disc to a sufficiently slow value and allowing rapid work.

To this end, the subject of the invention is a distributor for a seed spacing drill of the abovementioned type which is especially noteworthy in that the flat distributor disc includes at least two coaxial circular rows of holes which are subjected to a depression until they come close to a discharge device, and in that a deflector is located, relative to the distributor disc, so as to act only on the seeds located in the holes of the outermost row.

The elimination of double seeds takes place directly via the selector consisting of the deflector member for all the holes of the outermost row. With regard to the holes of the other rows, this elimination takes place by means of the seeds fixed to the holes of the outermost row. By virtue of this arrangement, it is still possible to obtain even sowing, particularly without double seeds, with a high density without increasing the rotational speed of the distributor disc.

According to one embodiment of the invention, the flat distributor disc includes two coaxial rows of holes, the holes of one row being angularly offset relative to the holes of the other row.

According to another characteristic of the invention, the diameter of the holes of the row close to the deflector is preferably greater than the diameter of the holes of the other rows.

By virtue of this arrangement, the number of double seeds on the holes of the rows other than the row on which the deflector member acts directly is limited.

According to another characteristic of the invention, the distance between two adjacent holes of two adjacent rows is at most equal to twice the mean diameter of the seeds to be sown. Advantageously, this distance lies between approximately one and one and a half times the mean diameter of the seeds to be sown.

By virtue of this arrangement, the indirect action of the deflector member is optimal.

BRIEF DESCRIPTION OF THE DRAWINGS

Other characteristics and advantages of the invention will become apparent from the description which follows of one embodiment of the invention, given with reference to the appended drawings in which.

Figure 1:
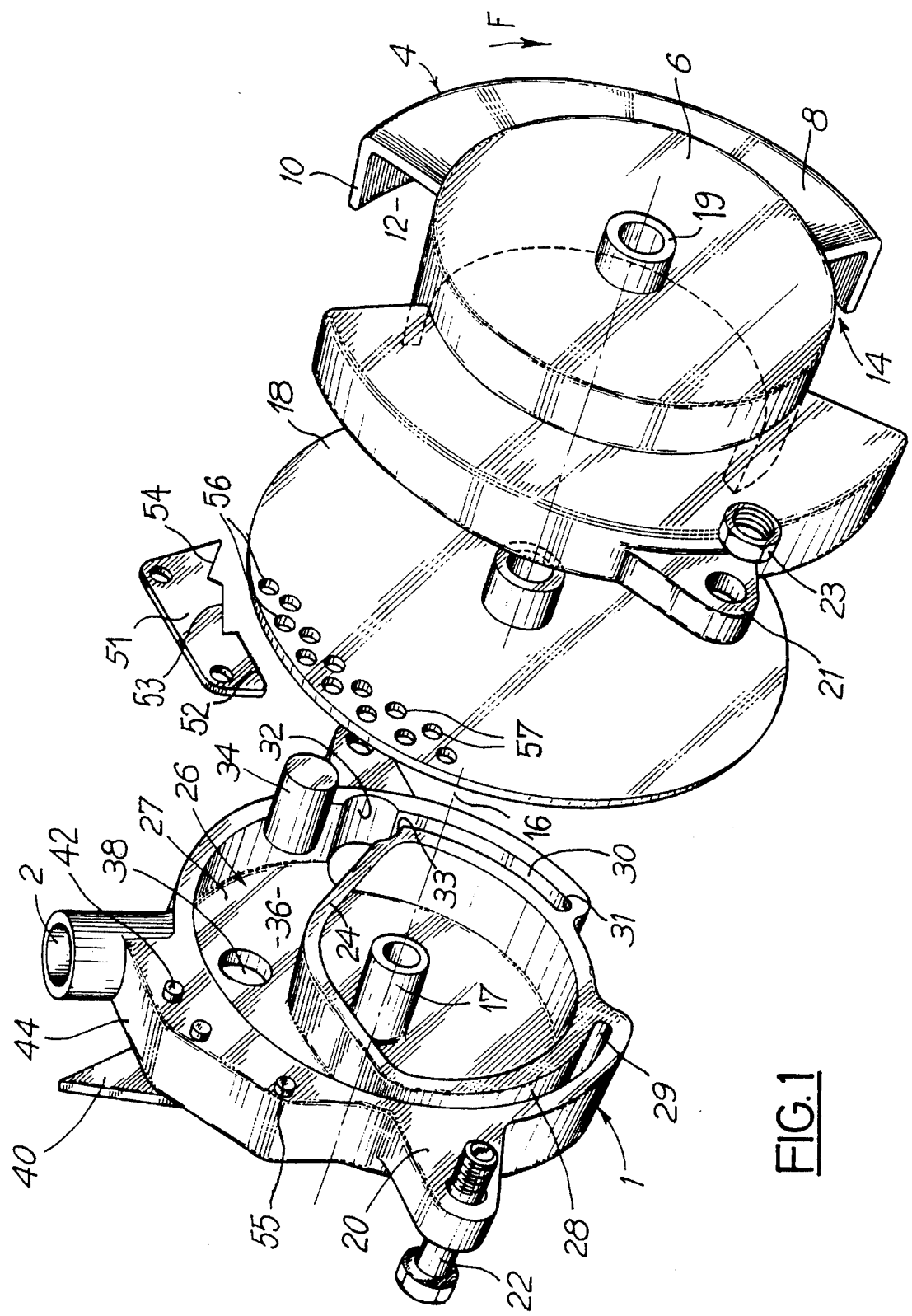
FIG. 1 is an exploded perspective view of a distributor for a seed spacing drill according to the invention.

A distributor for a seed spacing drill includes, as shown more particularly in FIG. 1, a casing of cylindrical overall shape which is made up of a housing 1 equipped at its upper part with a duct 2 for connection with a suction member, or with another appropriate source of depression, and a cover 4 which forms a seed container 6 surrounded by a flange 8 equipped at an periphery with a rim 10 extending from the flange inwardly towards the housing 1. The flange 8 is interrupted at an upper part 12, in order to provide communication of the internal volume with the outside atmosphere and at a lower part 14, in order to provide an opening for discharging the seeds. The housing 1 and the cover 4 are mounted on a shaft extending along axis 16 by means of cylindrical bearing surfaces, respectively 17 and 19, which allow the shaft to rotate.

The shaft is secured to a distributor disc 18 which is in sealed contact with the wall of the housing 1 and against which the cover 4 is held by any suitable means. For example, in the embodiment illustrated, the housing 1 and the cover 4 each include two lateral lugs 20 and 21 respectively through which two screws 22 pass and are coupled to nuts 23 to clamp the housing and cover together.

Inside the housing 1, a partition 24 defines, together with the wall of this housing, a suction or depression passage 26 in communication with the suction duct 2. The partition 24 has an upper part substantially in the shape of an inverted V. The depression passage 26 includes, in the vicinity of the suction duct 2, a wide upper part 27, substantially in the shape of a crescent. Each of the ends of this crescent is extended by a narrow peripheral branch, respectively 28 and 30. The two branches point towards one another but do not meet. In effect, the ends of the branches 28 and 30 are closed at the lower part of the housing 1 in line with the opening for discharging the seeds from the cover 4. The ends 29, 31 are, in the embodiment represented, slightly offset with respect to the opening 14 so that the end 29 of the branch 28 is higher than the end 31 of the branch 30. In fact, the end 30 of the descending branch, when considering the direction of rotation of the distributor disc 18, indicated by the arrow F, is normally at the lowermost point of the distributor.

At the upper part of the branch 30, the wall of the housing 1 and an opposing surface or face of the partition 24, each include a curved recess respectively 32 and 33, which together delimit a cavity for housing a shut-off member, made up, in the embodiment represented, by a cylindrical plug 34 but which may be formed by a flap, a slide or any other appropriate member. The plug 34 has an axial length equal to the depth of the housing 1 so that when the plug is installed in the cavity defined by recesses 32, 33, it totally shuts off the entrance of the branch 30 of the depression passage is shut off and the entrance is isolated from the suction duct 2. The plug 34 is, however, removable, and may easily be withdrawn when the branch 30 is to be subjected to a depression.

A wall 36 of the housing 1 is equipped, in the vicinity of the suction duct 2, with an air intake 38 which is associated with an operating lever 40 which pivots, on the exterior side of wall 36, about a shaft 42 which passes through an external boss 44 on the wall of the casing. The angular position of operating lever 40 advantageously controls the open cross-sectional area of air intake 38.

The distributor disc 18 interacts with a deflector member 51 of the type having a notched edge. The deflector is in the form of a plate and a succession of ramps 52, 53 and 54, on a lower edge, which are inclined relative to the circumference of the outermost row of holes. The deflector plate 51 is mounted so as to be fixed in position by shaft 42 and a shaft 55.

Figure 2:
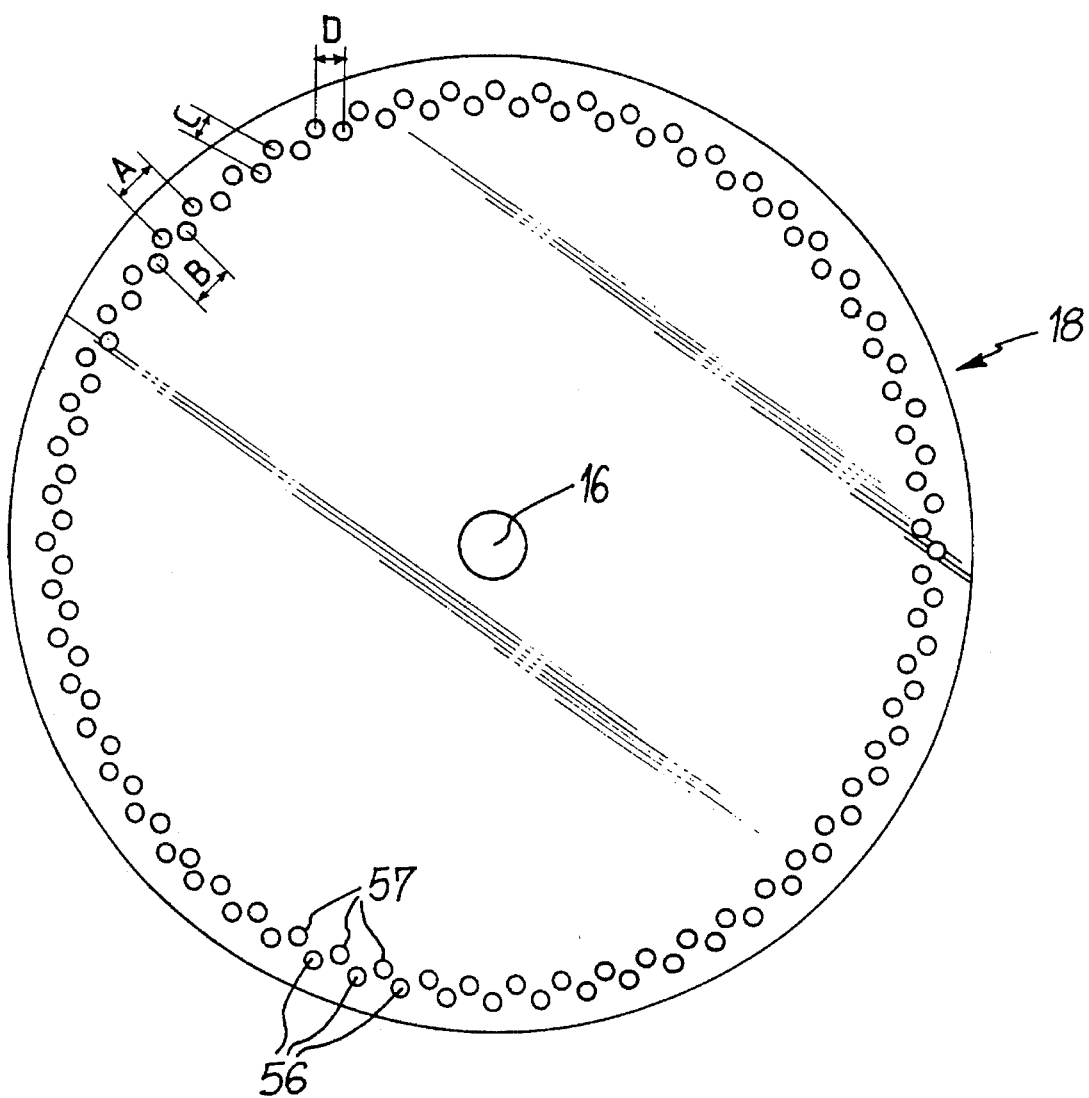
FIG. 2 represents a distributor disc according to the invention.
Figure 3:
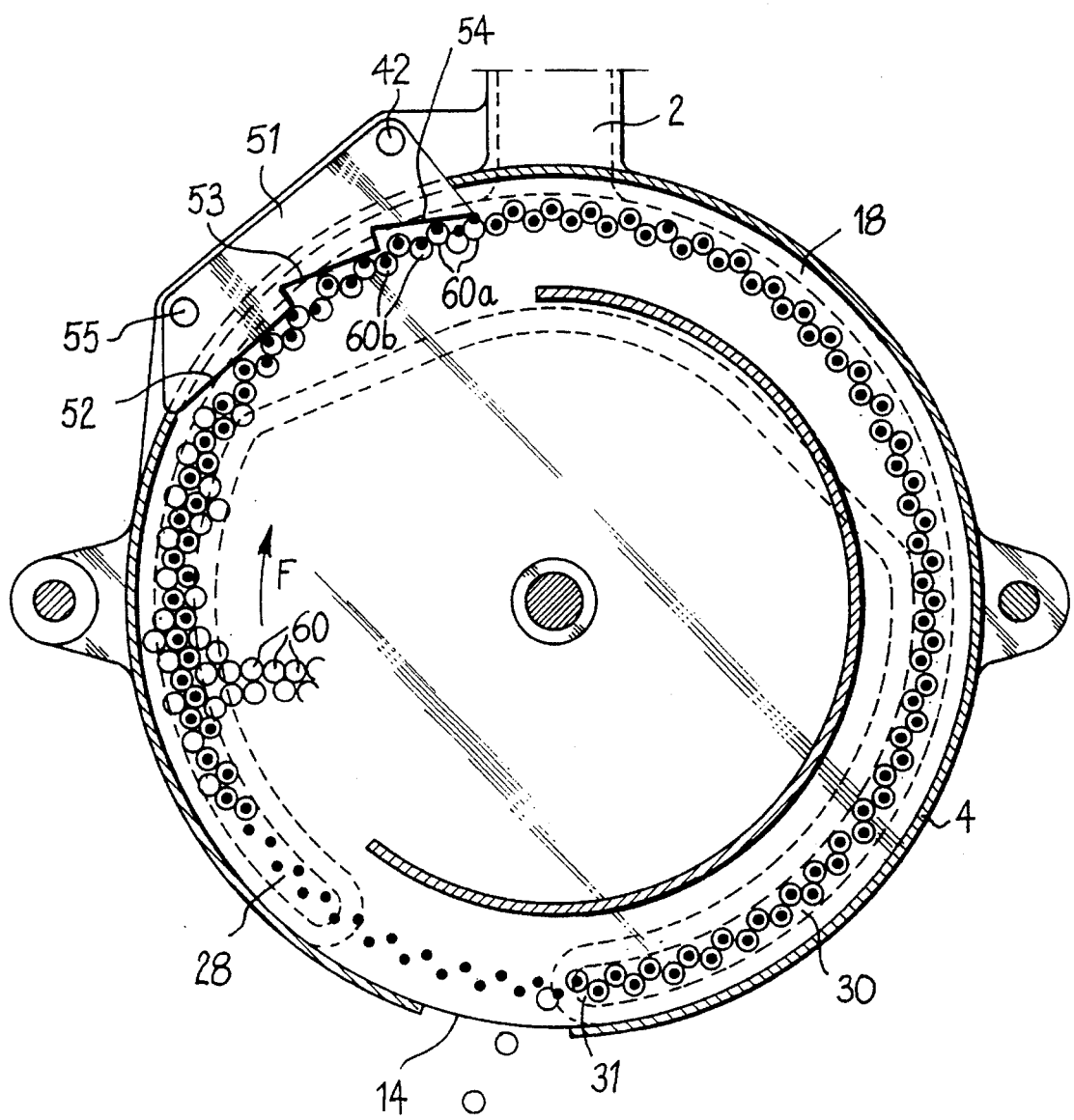
FIG. 3 is a sectional view of FIG. 1 illustrating the operation of the distributor disc of FIG. 2.

As can be seen in FIGS. 2 and 3, the distributor disc 18 may include several coaxial circular rows of holes. In the example represented, the disc includes two rows of holes 56 and 57 which have been represented only partially in FIG. 1. The two rows of holes 56 and 57 are circular and centered on the shaft 16, and are therefore coaxial.

As indicated above, the deflector plate 51 is located so as to act only on the holes 56 of the outer row.

Moreover, the plug 34 is removed so that the entire passage 26 is subjected to the depression. The width of the narrow branches 28 and 30 are such that the two rows of holes 56 and 57 are subjected to the depression, particularly until the branches come close to the opening 14 for discharging the seeds. In this way, seeds housed in the outer holes 56 and the inner holes 57 are subjected to the depression right up to the end 31 of the narrow branch 30, that is to say practically until the moment when the holes communicate with the discharge opening 14.

The two rows of holes, outer holes 56 and inner holes 57 are advantageously arranged in a staggered configuration, that is to say that an inner hole 57 is offset by the same distance relative to the closest two outer holes 56.

The distance between two holes of each row, A for the outer holes 56, and B for the inner holes 57, is at least equal to one times the mean diameter of the seeds to be sown. In this manner, the maximum sowing density is obtained.

A distance C between two adjacent holes of each of the two rows, the inner hole 57 being located upstream of the outer hole 56 relative to the direction of rotation, is at most equal to twice the mean diameter of the seeds to be sown. Advantageously, this distance is between one times and one and a half times the mean diameter of the seeds to be sown so that a pushing action of the outer seeds on the inner seeds located upstream is optimal.

According to the invention, the diameter of the holes of the outer row 56 is preferably greater than the diameter of the holes of the inner row 57, that is to say the row on which the deflector 51 acts indirectly.

The operation of the distributor according to the invention is illustrated in FIG. 3. The two rows of holes 56 and 57, in an upwards part of rotation, that is to say when the holes 56 and 57 face the narrow branch 28, entrain groups of seeds 60. When the holes arrive at the selector member 51, the seeds are subjected to the action of the ramps 52 to 54 which act directly on seeds 60a of the outer holes 56 and indirectly via seeds 60a, on seeds 60b which are held in the inner holes 57.

In effect, the outer seeds 60a are pushed back by the ramps 52 to 54 of the deflector 51 and the outer seeds 60a push back the inner seeds 60b, which causes the movement necessary for eliminating any seed overflow.

Owing to the fact that the diameter of the inner holes 57 is less than the diameter of the outer holes 56, the risk of double seeds on the inner holes is low, which further facilitates the elimination of double seeds on the holes of the inner row.

As a result, downstream of the deflector member 51 each of the outer holes 56 and inner holes 57 holds a single seed, which ensures even sowing without gaps or double seeds. The outer seeds 60a and the inner seeds 60b are entrained as far as the discharge opening 14 where the seeds fall onto the ground evenly, spaced.

It may therefore be seen that by virtue of the interaction of the distributor disc with double rows of seeds and of the deflector, the capacity of the disc can be practically doubled for one and the same rotational speed. This allows the working speed of the seed spacing drill to be increased.

The above description was given merely by way of non-limiting example and it is obvious that modifications or variations can be made without departing from the scope of the invention.

In particular, provision may be made for the two, outer and inner, rows not to be truly staggered, it being possible for the angular offset between the outer holes 56 and the inner holes 57 to vary.

Provision could equally well be made for the disc to include two radially-aligned rows of holes, that is to say for the outer holes 56 and the inner holes 57 to be located on one and the same radius.

Moreover, a greater number of rows of holes could be provided with the deflector member still acting only on the seeds situated in the outer holes.

These various variants allow seeds to be sown in pockets, that is to say that they allow sowing in which several seeds are deposited simultaneously.

Provision could equally well be made for the deflector member to be located inside the rows of seeds, that is to say that the deflector member could be located inside the circumference of the disc with the notched face pointing upwards. In this case, the deflector member acts directly on the seeds located in the holes of the innermost row which, in turn, act on the seeds of the next rows located downstream relative to the direction of rotation. The distance to be taken into account for adjacent holes of two adjacent rows is then the distance D (see FIG. 2).

The invention may equally well apply to precision seed drills including other types of selector. For example, it will be possible to use selectors including just one ramp. It is equally possible to use deflectors including two fingers acting above and below the seeds, of the fork deflector type.

The device for discharging the seeds may equally well be located not at the lower part of the casing but in this case the holes are a little further upstream. In that case, the holes are subjected to the depression until they come close to this discharge device.

The invention may equally well apply to pneumatic seed drills using compression, and not using depression, in which the seeds are pushed on to the holes by a stream of air.

I claim:

1. A distributor for a seed spacing drill, said distributor comprising:

a casing;

a flat distributor disc rotatably mounted in said casing, said disc having a plurality of concentric circular rows of circumferentially spaced holes, wherein said rows include at least an outermost row and an innermost row;

a seed container formed within said casing;

a port in said casing for communicating with a suction device;

a discharge opening in said casing; and a deflector mounted on said casing and at least partially overlapping said distributor disc, said deflector being positioned relative to at least one of said plurality of circular rows so as to leave said holes of said at least one row at least partially uncovered and all of said other circular rows of holes completely uncovered as said holes rotate past said deflector.

2. The distributor for a seed spacing drill as claimed in claim 1, wherein said at least one of said plurality of circular rows is said outermost row and said holes of said plurality of circular rows are of relative dimensions and spacing so that seeds engaged by said deflector and retained in said outermost row can act on seeds retained in an adjacent row of holes such that only one seed lies in each hole of said outermost circular row and said innermost circular row after passing said deflector.

3. A distributor for a seed spacing drill as claimed 2, wherein the diameter of said holes of said outermost circular row is greater than the diameter of said holes of said other circular rows.

4. A distributor for a seed spacing drill as claimed in claim 2, wherein the distance between two adjacent holes of two adjacent circular rows is at most equal to twice the mean diameter of the seeds to be sown.

5. A distributor for a seed spacing drill as claimed in claim 2, wherein the distance between two adjacent holes of two adjacent circular rows is between 1 and 1.5 times the mean diameter of the seeds to be sown.

6. A distributor for a seed spacing drill as claimed in claim 2, wherein said deflector is a plate having a lower notched edge which tangentially contacts, but does not overlap, said outermost circular row of holes.

7. The distributor for a seed spacing drill as claimed in claim 1, wherein said plurality of coaxial circular rows comprise two coaxial circular rows of holes, said holes of one of said two rows being radially aligned with said holes of said other of said two rows.

* * * * *